United States Patent
Nguyen et al.

(10) Patent No.: US 6,782,441 B1
(45) Date of Patent: Aug. 24, 2004

(54) ARBITRATION METHOD AND APPARATUS

(75) Inventors: Hien H. Nguyen, Auburndale, MA (US); Don M. Morrier, North Chelmsford, MA (US)

(73) Assignee: Sun Microsystems, Inc., Santa Clara, CA (US)

( * ) Notice: Subject to any disclaimer, the term of this patent is extended or adjusted under 35 U.S.C. 154(b) by 478 days.

(21) Appl. No.: 09/697,222

(22) Filed: Oct. 26, 2000

(51) Int. Cl.[7] .............................................. G06F 13/14
(52) U.S. Cl. ...................... 710/240; 710/243; 710/244
(58) Field of Search ................................. 710/240, 241, 710/243, 244, 40, 111, 112, 113, 107; 370/394, 395.42, 395.7, 418

(56) References Cited

U.S. PATENT DOCUMENTS

| | | | | |
|---|---|---|---|---|
| 5,278,828 A | * | 1/1994 | Chao | 370/394 |
| 5,794,073 A | * | 8/1998 | Ramakrishnan et al. | 710/40 |
| 6,003,101 A | * | 12/1999 | Williams | 710/112 |
| 6,253,262 B1 | * | 6/2001 | Rozario et al. | 710/39 |
| 6,442,631 B1 | * | 8/2002 | Neufeld et al. | 710/107 |
| 6,473,817 B1 | * | 10/2002 | Jeddeloh | 710/113 |

* cited by examiner

*Primary Examiner*—Khanh Dang
(74) *Attorney, Agent, or Firm*—Meyertons Hood Kivlin Kowert & Goetzel, P.C.; B. Noël Kivlin

(57) ABSTRACT

An arbitration method and mechanism assigning priority to one of a combination of requesters. A priority vector for the combination of requesters has a sequential list of requester identifiers. Upon receiving requests from the combination of requesters, the corresponding priority vector is referred to and the next requester identifier on this list is selected. Priority is awarded to the requester corresponding to that requester identifier. A priority vector is preferably provided for each possible combination of multiple requesters. The list of requester identifiers in each priority vector may be advantageously programmable. Preferably, all requester identifiers for a single requester are not provided in a contiguous clump within a given priority vector.

26 Claims, 3 Drawing Sheets

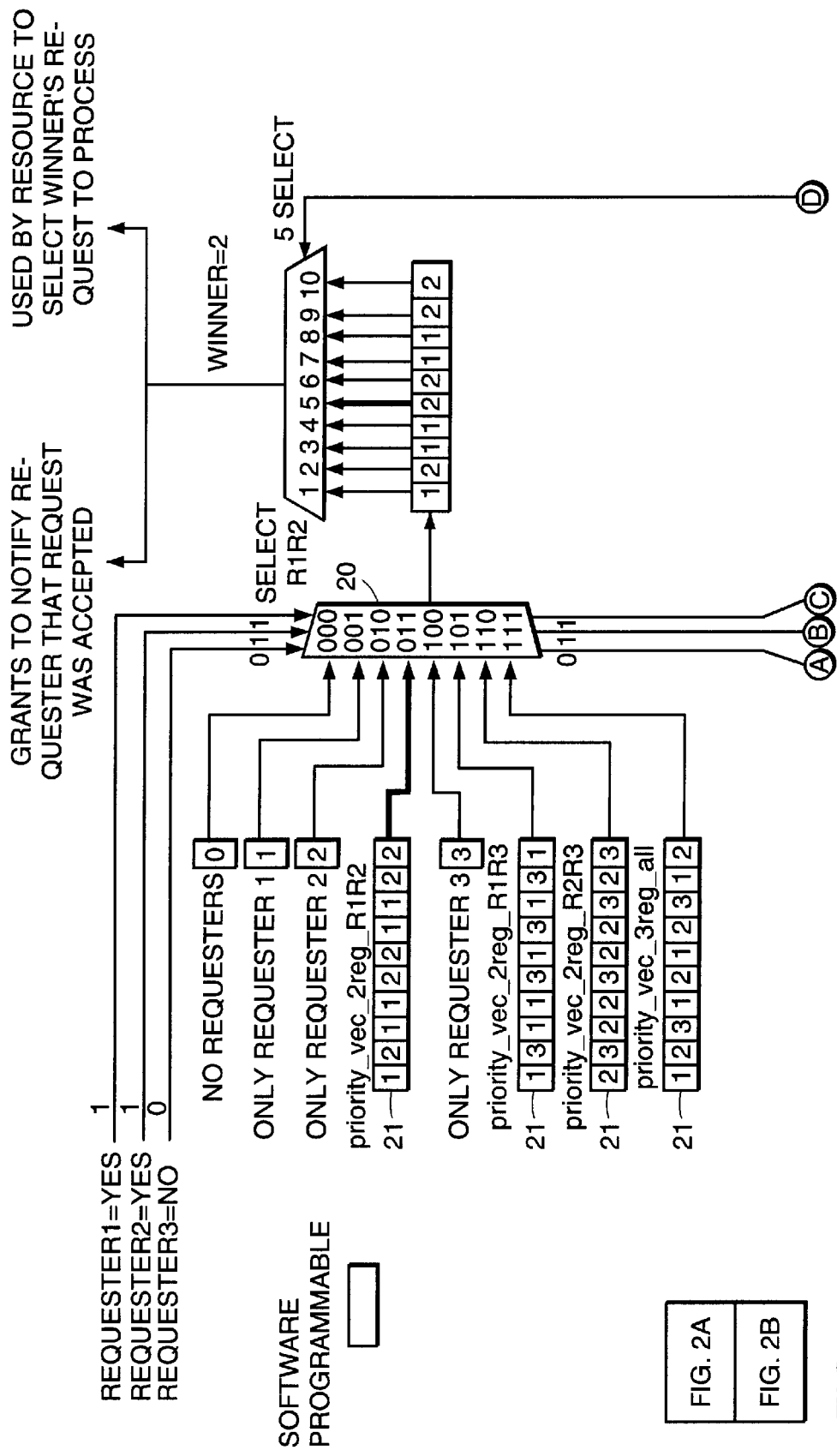

ARBITRATION METHOD AND APPARATUS

BACKGROUND OF THE INVENTION

The present invention relates to an arbitration mechanism for awarding priority to one of a plurality of requesters, in particular, such a mechanism which guarantees a minimum software programmable slice of available bandwidth to each requester.

Where there is a single resource in the data processing system whether that resource be a bus, an SRAM, a FIFO, etc., an arbitrator is required to control access to that resource. In accordance with many arbitration schemes, each requester has an assigned priority. Requesters with the same priority are given access in an equitable or round-robin fashion. Typically, requests with higher priority are given preferred access, preempting requests with lower priority. Additional mechanisms have been developed, that when added on top of such a system, prevent requesters with low priority from being starved from access to the resource.

SUMMARY OF THE INVENTION

In accordance with an arbitration method embodiment of the invention, requests for access to a resource are received from a combination of requesters. A priority vector associated with that combination of requesters is referred to in order to identify the requestor to be awarded priority. Requestor identifiers each corresponding to one of the requesters are listed sequentially in the priority vector. The number of requestor identifiers in the vector exceed the number of requesters in the combination. A pointer identifies a next requester identifier on the list. The next requester identifier is selected and the requester corresponding to that requester identifier is awarded priority. The pointer may be incremented sequentially through the list of requester identifiers. Programmability can be made available for the total number of requester identifiers in the priority vector and for the number of requester identifiers corresponding to each requester.

According to a further embodiment of the arbitration method, a plurality of priority vectors are provided, one for each possible combination of multiple requesters that may seek access to the resource. The priority vector is a sequence of requester identifiers, each requester identifier corresponding to one of the requesters. When requests for access are received from the combination of requesters, the priority vector corresponding to the given combination of requesters is used for selection of the next requester identifier. Priority is awarded to the requester corresponding to the next requester identifier.

In accordance with embodiments of an arbitration mechanism of the invention, a selector, responsive to requests for access from the requesters in a given combination of requesters, ascertains a next requester identifier from the sequence of requester identifiers in the priority vector corresponding to the given combination of requesters. Further, a pointer may be included for pointing to one of the requester identifiers in a priority vector. The sequence of requester identifiers may be held in a register.

A data processing system embodiment of the invention includes a resource, a plurality of requesters and an arbiter in communication with the requesters. The arbiter includes a selector responsive to the requests for ascertaining a next requester identifier from an appropriate priority vector and awarding priority to the requester corresponding to a next requester identifier.

Since each requester will have at least one requester identifier in the priority vector used to award priority, even low priority requesters, will be able to gain some minimal access to the resource. The ability to assign a percentage of bandwidth to each requester by adjusting the number of corresponding requester identifiers in priority vectors is an advantage of various embodiments of the invention.

Other objects and advantages of the invention will become apparent during the following description of the presently preferred embodiments of the invention taken in conjunction with the drawings.

DETAILED DESCRIPTION OF THE PREFERRED EMBODIMENTS

Figure 1:
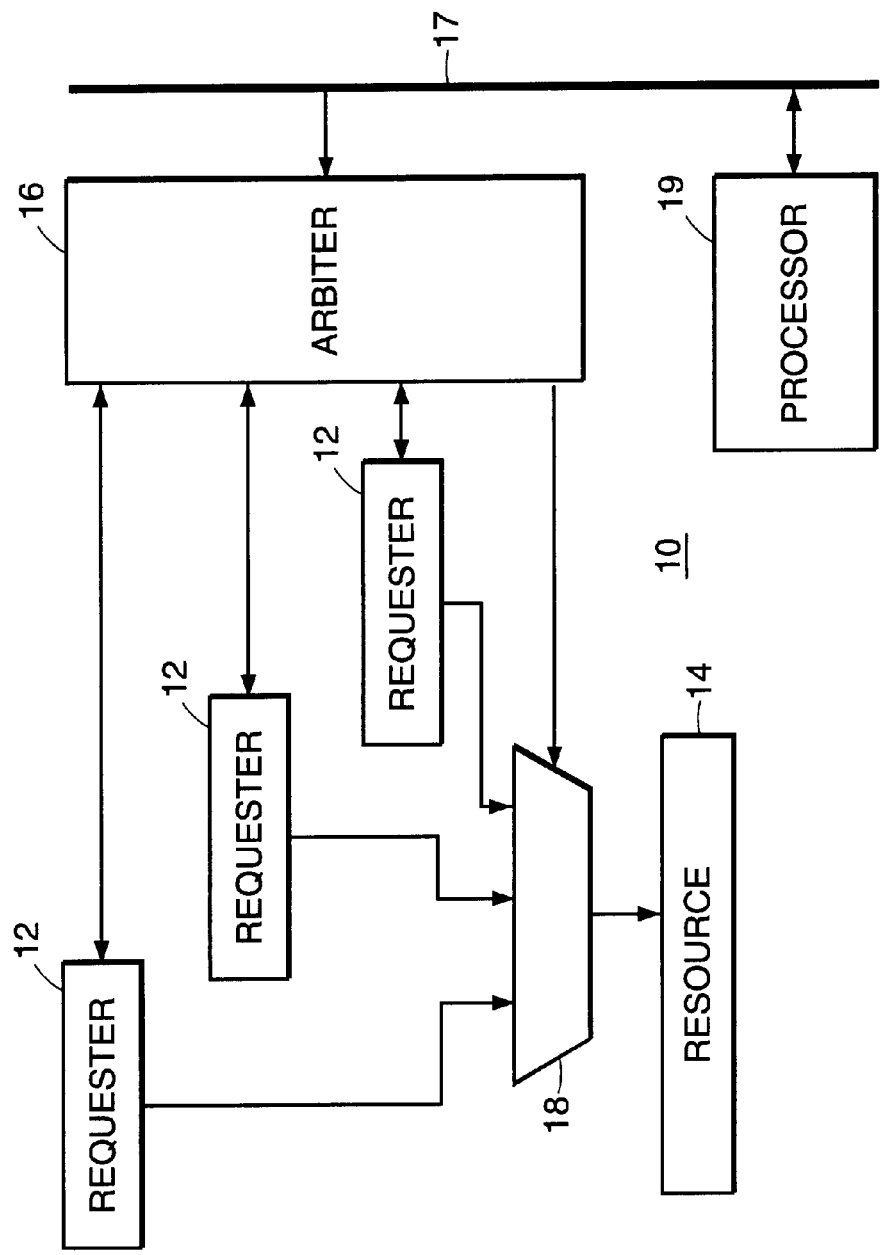
FIG. 1 is a block diagram of a data processing system of an embodiment of the present invention.

Referring now to FIG. 1, in the data processing system 10 it is often the case that a plurality of requesters 12 may at the same time request access to a single resource 14. The resource may be any of a variety of components such as a bus, an SRAM, a FIFO, a network communication port, a graphic processing pipeline, DRAM memory banks, a data structure in a data base program, etc. In order to decide which requester receives access to the single resource 14, an arbiter 16 is provided.

Arbiter 16 receives requests for access from any of a number of requesters. The arbiter 16 awards priority to one of the requesters. In a preferred embodiment, arbiter 16 sends a select signal to multiplexor 18 which selects the data from the requester awarded priority. The selected data proceeds to the resource 14. Also in this embodiment, arbiter 16 informs the requester awarded priority that its request was granted. Preferably, the arbiter is programmable. A processor 19 is shown for configuring the arbiter through a bus 17.

Figure 2B:
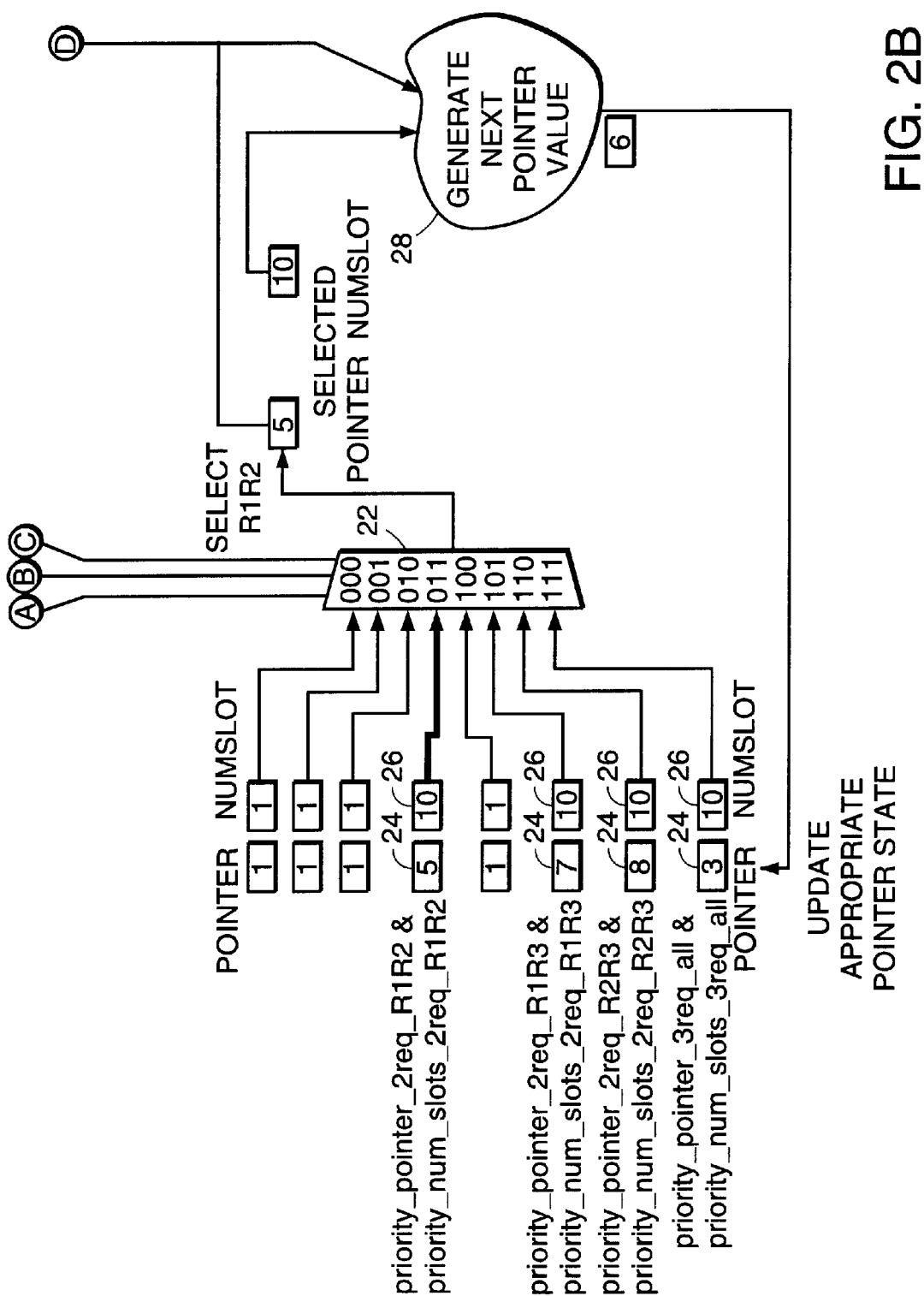
FIG. 2 is a schematic block diagram illustrating an arbitration method and mechanism of embodiments of the present invention.

A preferred embodiment of an arbiter of the present invention is illustrated in FIG. 2. The arbitration method is required when more than one requester 12 seeks access to a single resource at one time. For any given combination of requesters, the arbiter 16 has a priority vector 21 with a sequential list of requester identifiers. A requester identifier corresponds to one of the requesters. In a preferred embodiment, the number of requester identifiers in the list of the priority vector 21exceeds the number of requesters in the given combination. In accordance with further embodiments, each possible combination of multiple requesters is associated with a priority vector 21. For each priority vector 21, a pointer 24 or equivalent designator identifies the next requester identifier on the list. For the given combination of multiple requesters, the associated priority vector is referred to and the next requester identifier from that priority vector is selected. Priority is awarded to the requester corresponding to the next requester identifier. The pointer 24 is then changed to point to the next requester identifier along the sequence of requester identifiers. As described, the arbitration method may be performed entirely in software or in a combination of software and hardware as described below with respect to FIG. 2.

The arbitration mechanism includes a selector responsive to requests for access. The selector is responsible for ascertaining the next requester identifier in the appropriate priority vector for awarding priority to the requester corresponding to the next requester identifier. The selector in FIG. 2 includes a multiplexor 20 for selecting the appropriate priority vector and a multiplexor 22 for selecting the appropriate pointer. The multiplexor 20 receives an input for each possible requester indicating whether a request is pending for the single resource. The embodiment shown is for a system with a maximum of three requesters. Therefore, there is a priority vector 21 for all three requesters and three additional priority vectors 21 for each possible combination of two requesters. Based on which requesters have requests pending, the multiplexor 20 immediately selects the corresponding priority vector 21. In the example of the illustration, the first and second requesters have pending requests and the priority vector for requester 1 and requester 2 is selected.

Priority is awarded to the requester corresponding to the next requester identifier in the priority vector. The priority vector is a sequential list of requester identifiers, each requester identifier corresponding to one of the requesters. In the illustration, the requester identifier is simply the number 1, 2 or 3 corresponding respectively to requester 1, requester 2 or requester 3. In the priority vector for requester 1 and requester 2, the list includes requester identifiers corresponding to the two requesters 1 and 2. In the illustration, the priority vector for requester 1 and 2 split the priority 50/50 between requester 1 and requester 2, each one having five requester identifiers in the list. In the case where a requester has more than one requester identifier in the list, it is desirable not to clump all of its requester identifiers together as such arrangement may inordinately starve the other requester(s) out over a clump of time. Instead, it is preferred for each requester having more than one requester identifier, that its requester identifiers not be contiguous all to one another. This distributes the grant of priority to the various requesters more evenly over time.

The next requester identifier in a priority vector is indicated by a pointer 24. The multiplexor 22 receives the inputs indicating which requesters have a pending request and uses those inputs to immediately select the pointer corresponding to the selected priority vector. The pointer 24 is used to ascertain the next requester identifier which in turn determines which requester is awarded priority. The award of priority is signaled back to the requester so it knows its request is granted. The award of priority is also used by the resource to select the winning request and process it. In FIG. 1, this is through multiplexor 18. Upon using a pointer 24 to select the award of priority, the pointer needs to be shifted to point to the following requester identifier on the priority vector. This may be accomplished by simply incrementing the pointer. A vector length indicator (numslot) 26 accompanies the pointer for each priority vector. When the total number of requester identifiers in the priority vector have been traversed by the pointer as determined by the vector length indicator, the pointer will wrap around to the first requester identifier on the list. A pointer control module 28 receives the pointer and associated vector length indicator 26 so as to generate the next pointer value and substitute it into the pointer 24. The pointer control module 28 can be formed in hardware, software or anything in between.

In accordance with an embodiment of the present invention, the number of requester identifiers in the priority vector exceeds the number of requesters. Thus, for a system with three possible requesters, the priority vector for all three requesters exceeds three requester identifiers. The more requester identifiers in a priority vector, the smaller the minimum bandwidth which can be assigned to a low priority requester. A priority vector with 10 requester identifiers can assign as little as one requester identifier to a requester giving it approximately a 10% bandwidth. A priority vector with 16 requester identifiers permits assigning a bandwidth as small as about 6% to a low priority requester.

In accordance with an embodiment of the invention, the number of requester identifiers in any given priority vector is programmable. Software instructions can be used to set the vector length for each of the priority vectors. Further progammability is also available in that the proportion of requester identifiers assigned to the requesters can be varied for each priority vector. Although each priority vector can be individually programmed with a desired sequence and proportion of requester identifiers, it is generally preferable to determine a desired percentage bandwidth for each requester and have the various priority vectors attempt to achieve that goal. A system that desires to provide about 40% access to requester 1, about 40% access to requester 2 and about 20% access to requester 3 with a vector length of 10 for each priority vector is shown in FIG. 2. The priority vector for all three provides four requester identifiers for requester 1, four requester identifiers for requester 2 and two requester identifiers for requester 3. The priority vector for requesters 1 and 2 correspondingly provide five requester identifiers for requester 1 and five requester identifiers for requester 2. The priority vector for requesters 1 and 3 provides six requester identifiers for requester 1 and four requester identifiers for requester 3. Similarly the priority vector for requesters 2 and 3 provide six requester identifiers for requester 2 and four requester identifiers for requester 3. One might also have chosen to divide these vectors seven to three rather than six to four. As there are a small finite number of requester identifiers, bandwidth is only proportioned approximately. Increasing vector length can make the proportions more precise. Although it is preferred to have consistency of proportions among the priority vectors, it is within the scope of the invention that each priority vector be independently programmed with its own list of requester identifiers without regard to overall proportions. Each requester can thus be given a desired number of requester identifiers in the priority vectors. In each priority vector, the requester identifiers for any given requester are preferably spread across the vector and do not appear in a single contiguous clump.

The arbiter 16 of a presently preferred embodiment can be implemented on an ASIC. The priority vectors may be stored in a register. Each register may be divided into fields. One field provides slots that are tilled by the requester identifiers to form priority vectors. A second field indicates the vector length, i.e., the number of slots that are filled with requester identifiers. A large register can hold several priority vectors in separate fields and have associated fields which indicate the vector lengths for the corresponding priority vectors. The contents of the registers are programmable and may be filled to satisfy the requirements of a user through a processor 19 for example. Although shown and described with respect to hardware such as the multiplexors and registers, embodiments of the invention may also be made implementing aspects of the invention in software.

Although the embodiments hereinbefore described are preferred, many modifications and refinements which do not depart from the true spirit and scope of the invention may be conceived by those skilled in the art. For example, the requester identifiers need not be numbers that match their corresponding requester but may be assigned via any desired coding. Shifting the pointer along a priority vector may involve any of incrementing, decrementing or other algorithm for moving the pointer in sequence through a list of requester identifiers. It is intended that all such modifications, including but not limited to those set forth above, be covered by the following claims.

We claim:

1. A method of arbitrating requests for access to a resource for use in a data processing system having a plurality of requesters and the resource, said method comprising:

receiving requests for access from a combination of said requesters;

referring to a priority vector associated with said combination of requesters, each priority vector having a sequential list of a plurality of requester identifiers, the number of requester identifiers in the list exceeding the number of requesters in said combination, and a pointer to a next requester identifier on the list;

selecting the next requester identifier from the priority vector associated with said combination of requesters; and awarding priority to the requester corresponding to the next requester identifier.

2. The method of claim 1 further comprising setting the number of requester identifiers in the priority vector.

3. The method of claim 2 further comprising setting how many of the requester identifiers correspond to each requester in the combination of requesters associated with the priority vector.

4. The method of claim 3 wherein for those requesters having a plurality of requester identifiers in the priority vector, the corresponding requester identifiers for each of those requesters not all being contiguous in the sequential list.

5. The method of claim 1 wherein said act of referring comprises identifying from among a plurality of priority vectors, the priority vector associated with said combination of requesters.

6. The method of claim 1 comprising sequentially changing the pointer along the sequence of requester identifiers each time a next requester identifier is selected from the sequence.

7. A method of arbitrating requests for access to a resource for use in a data processing system having a plurality of requesters and the resource, said method comprising:

providing a plurality of priority vectors, one priority vector for each possible combination of multiple requesters seeking access to the resource, each vector being a sequence of a plurality of requester identifiers, each requester identifier corresponding to one of the requesters;

receiving requests for access to the resource from a given combination of said requesters;

selecting one of the requester identifiers from the priority vector corresponding to the given combination of requesters;

awarding priority to the requester corresponding to the selected one of the requester identifiers.

8. The method of claim 7 further comprising assigning each requester in the combination of requesters corresponding to one of the priority vectors a chosen number of requester identifiers in the priority vector.

9. The method of claim 8 wherein for those requesters having a chosen number greater than one for one of said priority vectors, the corresponding requester identifiers for each of those requesters not all being contiguous in the sequence of requester identifiers.

10. The method of claim 7 further comprising providing a pointer for each priority vector that points to the one of the requester identifiers in the priority vector and sequentially changes along the sequence of requester identifiers each time one of the requester identifiers is selected from its priority vector.

11. A method for providing at least minimal access to a resource for each requester among a plurality of requesters, said method comprising:

providing a plurality of priority vectors, each priority vector corresponding to a possible combination of said requesters and being capable of holding a set number of a plurality of requester identifiers in a sequence;

programming each priority vector such that it contains a desired number of requester identifiers corresponding to each of the requesters in the corresponding combination of requesters;

pointing to a next requester identifier in each of said priority vectors;

awarding priority to a requester from a combination of said requesters by identifying the next requester in the priority vector corresponding to the combination of requesters and pointing to a requester identifier following the next requester identifier in the sequence of said priority vector.

12. The method of claim 11 wherein for each requester having a number of requester identifiers greater than one in one of said priority vectors, the corresponding requester identifiers not all being contiguous in the sequence of requester identifiers of said one of said priority vectors.

13. The method of claim 11 further comprising programming the set number of requester identifiers for each priority vector.

14. The method of claim 11 wherein pointing to a requester identifier following the next requester identifier is performed in a wrap around manner whereby a last requester identifier in the sequence is followed by a first requester identifier in the sequence.

15. An arbitration mechanism for arbitrating requests for access to a resource comprising:

a plurality of priority vectors, each providing a sequence of a plurality of requester identifiers corresponding to requesters, the requester identifiers in each priority vector corresponding to requesters forming a different combination of requesters from the combination of requesters corresponding to any of the other of said priority vectors;

a selector, responsive to requests for access from the requesters in a given combination of requesters, for ascertaining a next requester identifier in sequence in the priority vector corresponding to the given combination of requesters and awarding priority to the requester corresponding to the next requester identifier.

16. The arbitration mechanism of claim 15 wherein each priority vector has a number of requester identifiers exceeding the number of requesters in the respective combination of requesters.

17. The arbitration mechanism of claim 15 wherein for each requester having a number of requester identifiers greater than one in one of said priority vectors, the corresponding requester identifiers not all being contiguous in the sequence of requester identifiers of said one of said priority vectors.

18. The arbitration mechanism of claim 15 further comprising a processor that sets the total number of requester identifiers in each priority vector and sets the number of requester identifiers corresponding to any given requester in each priority vector.

19. An arbitration mechanism comprising:

a register for holding a sequence of requester identifiers, said register including a plurality of requester identifiers corresponding to each requester of a combination of requesters, wherein the number of requester identifiers in said register exceeds the number of requesters in said combination;

a pointer for pointing to one of the requester identifiers in said register; and a selector, responsive to requests from the requesters in the combination of requesters, for awarding priority to the requester corresponding to the requester identifier being pointed at by said pointer; and means for shifting said pointer along the sequence of requester identifiers.

20. The arbitration mechanism of claim 19 wherein said pointer shifts sequentially through said sequence of requester identifiers in a wrap around manner, whereby from a last requester identifier in the sequence, said pointer shifts to a first requester identifier in said sequence.

21. The arbitration mechanism of claim 19 further comprising a plurality of said registers, each including requester identifiers corresponding to a different combination of requesters.

22. The arbitration mechanism of claim 21 wherein said selector responds to requests from a given combination of requesters by awarding priority using the register having requester identifiers corresponding to the given combination of requesters.

23. A data processing system comprising:

a resource;

a plurality of requesters;

an arbiter in communication with said plurality of requesters, said arbiter including:

a plurality of priority vectors, each providing a sequence of a plurality of requester identifiers, each requester identifier corresponding to one of said requesters, the requester identifiers in each priority vector corresponding to requesters from a combination of requesters different from the combination of requesters corresponding to any of the other of said priority vectors;

a selector, responsive to requests for access to said resource from the requesters in a given combination of said requesters, for ascertaining a next requester identifier in sequence in the priority vector corresponding to the given combination of requesters and awarding priority to the requester corresponding to the next requester identifier.

24. The data processing system of claim 23 wherein each priority vector has a number of requester identifiers exceeding the number of requesters in the respective combination of requesters.

25. The data processing system of claim 23 wherein for each requester having a number of requester identifiers greater than one in one of said priority vectors, the corresponding requester identifiers not all being contiguous in the sequence of requester identifiers of said one of said priority vectors.

26. The data processing system of claim 23 further comprising a processor that sets the total number of requester identifiers in each priority vector and sets the number of requester identifiers corresponding to any given requester in each priority vector.

* * * * *

UNITED STATES PATENT AND TRADEMARK OFFICE
CERTIFICATE OF CORRECTION

PATENT NO. : 6,782,441 B1  Page 1 of 1
DATED : August 24, 2004
INVENTOR(S) : Nguyen et al.

It is certified that error appears in the above-identified patent and that said Letters Patent is hereby corrected as shown below:

Title page,
Item [*] Notice, please delete "406" and add -- 478 --.

Signed and Sealed this

Thirtieth Day of August, 2005

JON W. DUDAS
*Director of the United States Patent and Trademark Office*